US007311956B2

(12) United States Patent
Pitzen

(10) Patent No.: US 7,311,956 B2
(45) Date of Patent: Dec. 25, 2007

(54) LAMINATE AND METHOD USED FOR APPLYING A DESIGN TO A SUBSTRATE

(75) Inventor: James F. Pitzen, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 726 days.

(21) Appl. No.: 10/304,730

(22) Filed: Nov. 26, 2002

(65) Prior Publication Data

US 2004/0101647 A1 May 27, 2004

(51) Int. Cl.
*B32B 9/00* (2006.01)

(52) U.S. Cl. ......................... 428/40.1; 40/594; 40/596; 40/615; 40/616; 156/227; 156/230; 156/240; 428/409; 428/41.9; 428/42.1; 428/42.2; 428/42.3; 428/914

(58) Field of Classification Search ............... 428/40.1, 428/40.9, 41.9, 42.1, 914, 42.2, 42.3; 40/594, 40/596, 615, 616; 156/227, 230, 240
See application file for complete search history.

(56) References Cited

U.S. PATENT DOCUMENTS 3,294,611 A * 12/1966 Vomela ...................... 156/230
3,761,344 A * 9/1973 Mrozek ..................... 428/42.2

(Continued)

FOREIGN PATENT DOCUMENTS

EP 0 076 593 A1 4/1983
EP 0 241 213 A1 10/1987
EP 0 580 981 A1 2/1994

OTHER PUBLICATIONS

U.S. Appl. No. 09/761,797, filed Jan. 17, 2001, Method for Applying Designs to a Substrate.

*Primary Examiner*—Nasser Ahmad
(74) *Attorney, Agent, or Firm*—David B. Patchett

(57) ABSTRACT

A laminate for use in decorating a receptor surface (e.g., a window) comprising a piece of decorative sheet material with a layer of aggressive pressure sensitive adhesive on its rear surface and a release liner over that layer of adhesive; and a flexible, temporary support tape comprising a backing and a layer of repositionable pressure sensitive adhesive on a second surface of the backing. A longitudinally extending part of the layer of repositionable pressure sensitive adhesive of the support tape is adhered to a front surface of the decorative strip, and an elongate portion of the support tape projects transversely away from a first edge surface of the decorative sheet material. The repositionable pressure sensitive adhesive on that projecting portion of the support tape can be adhered to a receptor surface with the first release liner on the decorative sheet material laying along that receptor surface, and can be repositioned as needed to precisely position the decorative sheet material in a desired location. Once so positioned, the flexible backing can be bent along a longitudinally extending bend line along the first edge of the decorative sheet material to separate the decorative sheet material from the receptor surface so that the first release liner can be manually removed. The decorative sheet material can then be moved back into contact with the receptor surface so that its layer of aggressive pressure sensitive adhesive adheres the decorative sheet material against the receptor surface in the desired location, after which the temporary support tape can be peeled away.

8 Claims, 4 Drawing Sheets

U.S. PATENT DOCUMENTS 4,604,153 A * 8/1986 Melbye ...................... 156/235
4,900,604 A * 2/1990 Martinez et al. .............. 428/79
4,990,244 A 2/1991 Anderson
5,665,446 A 9/1997 Sundet
5,840,407 A 11/1998 Futhey et al.
5,882,774 A 3/1999 Jonza et al.
2002/0092593 A1 7/2002 Erickson
2002/0092608 A1 7/2002 Erickson et al.

* cited by examiner

LAMINATE AND METHOD USED FOR APPLYING A DESIGN TO A SUBSTRATE

FIELD OF THE INVENTION

The present invention relates to assemblies and methods used for applying adhesive coated decorative sheet material to substrates such as sheets of glass.

DESCRIPTION OF THE RELATED ART

Several decorative sheet materials are known that can be adhered to substrates such as sheets of glass to decorate the substrate. Typically these materials have an outer major surface that is viewed to see the decorative aspect of the materials, a layer of aggressive pressure-sensitive adhesive selected to form strong bonds to glass on an opposite rear surface, and a low-adhesion release liner over the surface of the adhesive opposite the sheet material. One such decorative sheet material is a length of film that has grooves, vapor coating and/or other structure along its outer major surface so that the decorative film visually simulates decorative glass, such as glass with a single bevel, beveled edges, or with a central groove along its length (e.g., a V shaped groove), or with a leaded appearance, or with a textured surface, or visually simulates a glass related structure such as metal came (e.g., the pieces of optical film described in U.S. Pat. No. 5,840,407 issued Nov. 24, 1998). Tapes including a length of the type of optical film disclosed in U.S. Pat. No. 5,840,407 and a layer of aggressive pressure sensitive adhesive along a rear major surface protected by a release liner are commercially available as 3M™ Accentrim™ Tape, series B200 (V-groove tape) and series B100 (edge bevel tape), from 3M Company, St. Paul, Minn. Other such decorative sheet materials include the decorative birefringent multiplayer film available from Minnesota Mining and Manufacturing Company, St. Paul, Minn., under the trade designation "Radiant Light Film" that is described in U.S. Pat. No. 5,882,774; or the vinyl films also available from Minnesota Mining and Manufacturing Company, that can be applied to glass panes to form graphics that appear to have been etched or sand-blasted into the glass at a fraction of the cost of actual etching or sand blasting. These vinyl films, typically plasticized poly(vinyl chloride), are marketed as Scotchcal™ Series 7725 special effects films. Among these, Scotchcal™ 7725-314 Dusted Crystal Film gives the appearance of etched glass, and Scotchcal™ 7725-324 Frosted Crystal Film gives the decorative appearance of sand-blasted glass.

Applying such decorative sheet materials to a substrate in a desired location can be difficult because of the aggressive nature of the adhesive on the sheet materials. Once that adhesive contacts a dry substrate such as a glass surface it is difficult if not impossible to reposition. Thus those applying the decorative materials face the challenge of making an initial contact between the flexible decorative sheet materials and the substrate with the decorative sheet materials at a precise predetermined position, which challenge can not always be met, particularly by persons with little experience in applying the sheet materials.

Various approaches have been developed for applying such decorative sheet materials to substrates with the sheet materials at desired predetermined locations relative to each other and along the substrate.

U.S. Pat. No. 5,665,446 describes a method for applying aggressive pressure-sensitive adhesive coated decorative sheet materials or graphics to a substrate (e.g., a sheet of glass) using a laminate comprising a polymeric cover sheet and a layer of pressure-sensitive adhesive adhered to one surface of the cover sheet with the cover sheet and layer of pressure-sensitive adhesive being vented. Generally that method includes the steps of (1) adhering surfaces of the graphics opposite their layers of pressure-sensitive adhesive to the layer of pressure-sensitive adhesive on the laminate so that they will have precise relative positions; (2) using a solution to wet the graphics, the laminate and the substrate; (3) placing the graphics adhered to the layer of pressure-sensitive adhesive on the laminate at a desired location on the substrate; (4) sliding the wet laminate and graphics along the wet substrate as needed to obtain a desired position; (5) pressing out air and water from between the substrate and the graphics adhered to the layer of pressure-sensitive adhesive on the laminate; (6) allowing the solution to dry; and (7) removing the laminate to leave the graphics firmly adhered to the substrate.

U.S. Pat. No. 6,805,932, describes a method for persons such as homeowners to apply to a substrate (e.g., a sheet of glass) decorative designs made using separate pieces of optical film of the type described in U.S. Pat. No. 5,840,407, each of which pieces has a layer of adhesive along one surface, and an opposite outer major structured surface described above. Generally, that method comprises the steps of(1) providing a kit including a layer of pre-mask material that is at least translucent comprising a cover sheet with a layer of removable adhesive (e.g., pressure-sensitive adhesive) firmly adhered to one surface; a predetermined printed design; and pieces of optical film having peripheral shapes that correspond to parts of the printed design, each of which pieces of optical film have a layer of adhesive (e.g., pressure-sensitive adhesive) along one surface, and an opposite outer major surface (e.g., a grooved and/or vapor coated surface) so that the pieces visually simulate decorative structures; (2) placing the pieces of optical film over portions of the design corresponding to their shapes with the outer major surfaces of the pieces of film along a common plane; (3) adhering the layer of adhesive on the layer of pre-mask material to the outer major surfaces of the pieces of film; (4) placing the pieces of optical film adhered to the layer of adhesive on the layer of pre-mask material at a desired location on the substrate, (5) pressing the layer of pre-mask material and thereby the pieces of optical Win adhered to the layer of pre-mask material against the substrate, during which pressing step, the layer of pro-mask material protects the outer major surfaces of the pieces of film from damage; and (6) removing the layer of pre-mask material to leave the pieces of optical film adhered to the substrate in the predetermined design. Preferably the layer of pro-mask material is or has been made transmissive of moisture vapor (e.g., a layer of pre-mask material that is vented as described in U.S. Pat. No. 5,665,446), a wetting liquid is used to wet the pieces of optical film, the layer of pre-mask material and the substrate prior to the step of placing the pieces of optical film adhered to the layer of adhesive on the layer of pry-mask material at a desired location on the substrate, which wetting liquid allows sliding the wet pieces of optical film and layer of pre-rnask material along the wet substrate as needed to obtain a desired position for the pieces of optical film, and is allowed to dry between the pressing step and the step of removing the layer of pre-mask material.

U.S. Pat. No. 6,571,849, describes using a computer operated machine to form and accurately apply to a substrate (e.g., a sheet of glass in a window, door, or mirror) decorative designs made of decorative sheet material in strips, such as strips of the optical film described in U.S. Pat. No. 5,840,407.

U.S. Pat. No. 6,773,537, describes modifying the machine described in U.S. Pat. No. 6,571,849 and using it to form a laminate that persons such as homeowners can use to accurately apply to a substrate (e.g., a sheet of glass) decorative designs made of strips of decorative sheet material of the types described above. Generally the tape applicator forms the strips of decorative sheet material with different predetermined lengths and end shapes from a supply length of the strip of decorative material and either (1) adheres the coatings of adhesive on them to a release liner in a predetermined pattern, after which a layer of removable adhesive on a layer of pre-mask material can be adhered over the outer major surfaces of the display lengths of decorative film tape adhered to the release liner and to the release liner around the display lengths of decorative film tape to make the laminates; or (2) adheres their front surfaces to the layer of removable adhesive on the layer of pre-mask material in a predetermined pattern, after which the release liner can be applied over the coatings of adhesive on them to make the laminate. That laminate can then be used to apply the strips of decorative material to a substrate in the maimer described above with reference to U.S. Pat. No. 5,665,446.

While all of the approaches described above are useful for applying decorative materials to substrates, the search is ongoing for other useful structures and methods for doing so.

SUMMARY OF THE INVENTION

The present invention provides a laminate and a method using that laminate by which a person can quickly and accurately apply decorative material coated with aggressive pressure sensitive adhesive to a substrate in a desired pattern that for some types of applications is simpler, and more versatile than the prior art approaches described above.

According to the present invention there is provided a laminate for use in decorating a receptor surface such as the surface of a window or mirror. That laminate comprises an piece of decorative sheet material with a generally straight first edge surface, a layer of aggressive pressure sensitive adhesive on its rear surface, and a first release liner over a surface of that layer of adhesive opposite the decorative sheet material; and a flexible, temporary support tape comprising a backing and a layer of repositionable pressure sensitive adhesive on a second surface of the backing. A part of the layer of repositionable pressure sensitive adhesive adjacent a second edge surface of the backing is adhered to a front surface of the decorative material with a portion of the support tape projecting away from the first edge surface of the decorative strip. The repositionable pressure sensitive adhesive on that projecting portion of the support tape can be adhered to a receptor surface with the release liner on the decorative material laying along that receptor surface, and can be repositioned as needed to precisely position the decorative strip in a desired location along that receptor surface. Once so positioned, the flexible backing can be bent along a bend line along the first edge of the decorative material to separate the decorative material from the receptor surface so that the release liner can be manually removed. The layer of aggressive pressure sensitive adhesive on the decorative material can then be moved into contact with the receptor surface to adhere the decorative material against the receptor surface in the desired location, after which the temporary support tape can be peeled away from both the receptor surface and the decorative material.

BRIEF DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 1:
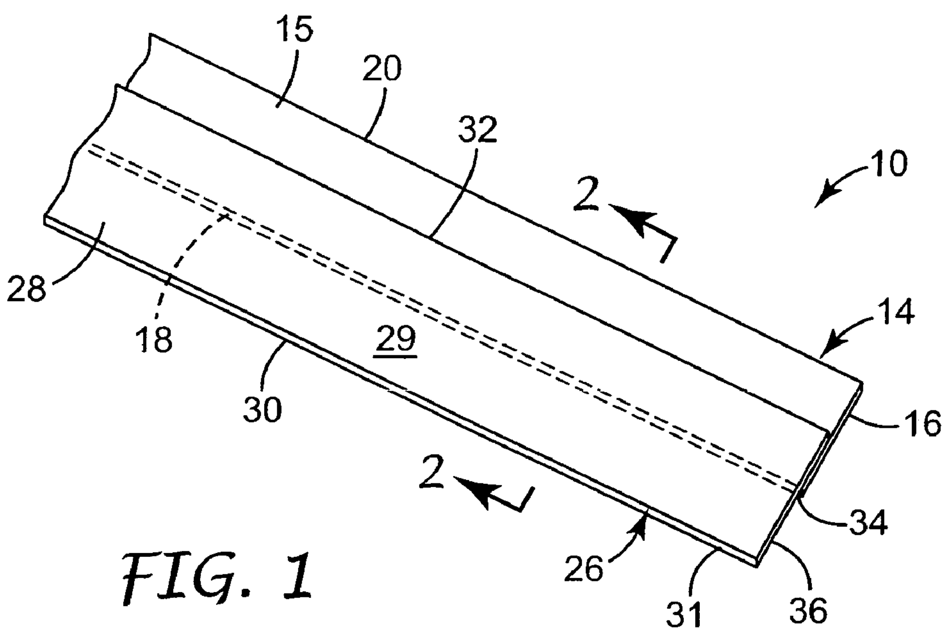
FIG. 1 is a perspective view illustrating a first embodiment of a laminate according to the present invention that can be used to accurately apply at a desired location a decorative strip included in the laminate to a receptor surface such as that of a pane of glass.

Referring now to FIG. 1 there is illustrated a first embodiment of a laminate 10 according to the present invention for use in decorating a receptor surface such as the surface 12 of a window or mirror which can be done using a method according to the present invention illustrated in FIGS. 3 through 6. The laminate 10 comprises a piece or elongate strip of decorative sheet material 14 having opposite front and rear surfaces 15 and 16 extending between a generally straight first edge surface 18 and an opposite second edge surface 20 of the decorative sheet material 14. A layer 22 of aggressive pressure sensitive adhesive is on the rear surface 16 of the decorative sheet material 14, and a first release liner 24 is over a surface of the layer of aggressive pressure sensitive adhesive opposite the decorative sheet material 14. The laminate 10 also includes a flexible, temporary support tape 26 comprising a flexible backing 28 having opposite first and second surfaces 29 and 30 extending between opposite first and second edge surfaces 31 and 32 of the backing 28, and a layer 34 of repositionable pressure sensitive adhesive on its second surface 30. A part of the layer 34 of repositionable pressure sensitive adhesive adjacent the second edge surface 32 of the backing 28 is adhered to the front surface 15 of the decorative strip 14 with a portion 36 of the support tape 26 projecting away from the first edge surface 18 of the decorative sheet material 14.

Figure 3:
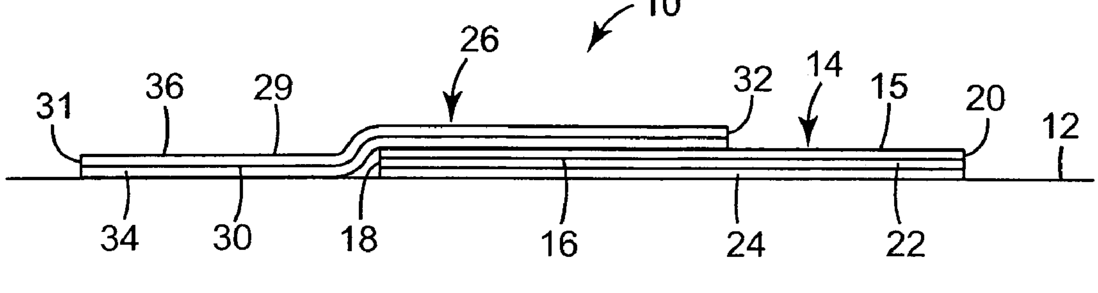
FIGS. 3, 4, 5, and 6 are end views illustrating use of the laminate of FIG. 1 to apply a decorative strip at a desired location along a receptor surface.
Figure 4:
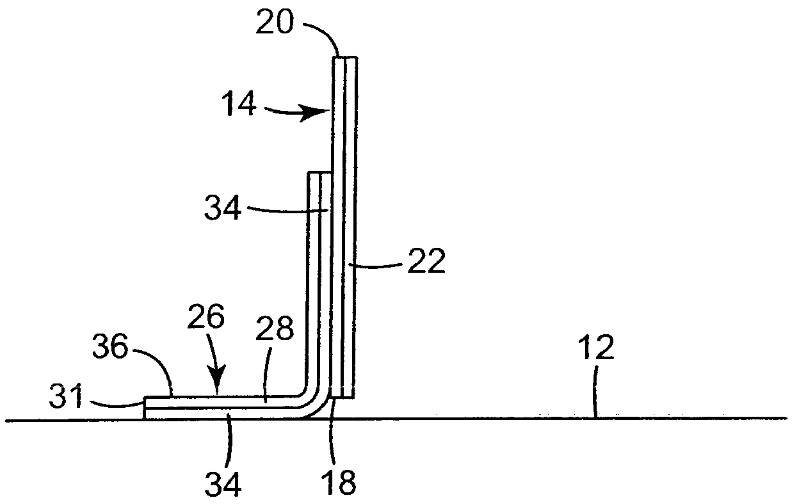
Figure 5:
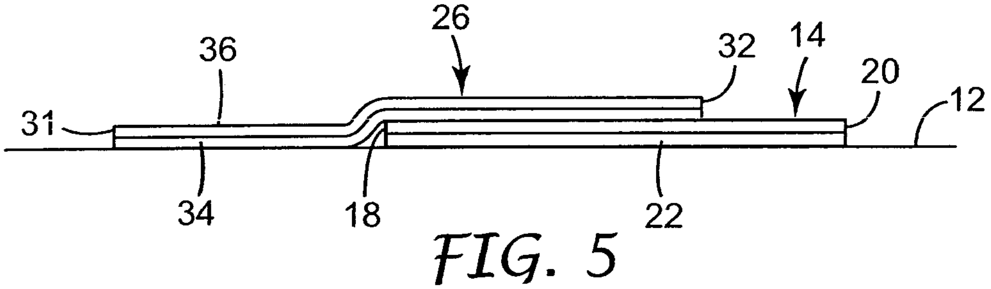
Figure 6:
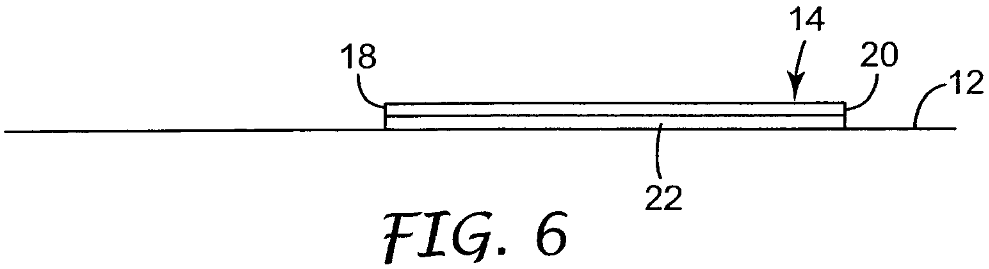

As can be seen in FIG. 3, the layer 34 of repositionable adhesive on the projecting portion 36 of the support tape 26 can be adhered to the receptor surface 12. The support tape 26 can then be repositioned along the receptor surface 12 with the first release liner 24 on the decorative sheet material 14 laying along that receptor surface 12 to afford precise positioning of the decorative sheet material 14 in a desired location along that receptor surface 12. After that desired location is obtained, the flexible backing 28 is bendable along a bend line along the first edge surface 18 of the decorative sheet material 14 to afford movement of the decorative sheet material 14 away from the receptor surface 12 as is illustrated in FIG. 4 and thereby afford access to and manual removal of the first release liner 24, leaving exposed the layer 22 of aggressive pressure sensitive adhesive on the decorative sheet material 14. The decorative sheet material 14 can then be repositioned by bending straight the backing 28 as is illustrated in FIG. 5 to place the layer 22 of aggressive pressure sensitive adhesive against the receptor surface 12 and thereby adhere the decorative sheet material 14 against the receptor surface 12 in the desired location, after which the temporary support tape 26 can be peeled away from both the receptor surface 12 and the decorative sheet material 14, leaving the decorative sheet material in that desired location along the receptor surface 12 as is illustrated in FIG. 6.

The elongate strip of decorative sheet material 14 can be any sheet material that provides decoration for a substrate including (but not limited to) the film that has grooves, vapor coating and/or other structure along its outer major surface so that the decorative sheet material or film visually simulates decorative glass, such as glass with a single bevel, beveled edges, or with a central groove along its length (e.g., a V shaped groove), or with a leaded appearance, or with a textured surface, or visually simulates a glass related structure such as metal came (e.g., the pieces of optical film described in U.S. Pat. No. 5,840,407 issued Nov. 24, 1998, the content whereof is hereby incorporated herein by reference). Tapes including a length of the type of optical film disclosed in U.S. Pat. No. 5,840,407 and a layer of aggressive pressure sensitive adhesive along a rear major surface protected by a release liner are commercially available as 3M™ Accentrim™ Tape, series B200 (V-groove tape) and series B100 (edge bevel tape), from 3M Company, St. Paul, Minn. Other such decorative sheet materials that can be used include the decorative birefringent multiplayer film available from Minnesota Mining and Manufacturing Company, St. Paul, Minn., under the trade designation "Radiant Light Film" that is described in U.S. Pat. No. 5,882,774 (the content whereof is hereby incorporated herein by reference); or the vinyl films also available from Minnesota Mining and Manufacturing Company, that can be applied to glass panes to form graphics that appear to have been etched or sand-blasted into the glass at a fraction of the cost of actual etching or sand blasting. These vinyl films, typically plasticized poly(vinyl chloride), are marketed as Scotchcal (trade mark) Series 7725 special effects films. Among these, Scotchcal (trade mark) 7725-314 Dusted Crystal Film gives the appearance of etched glass, and Scotchcal (trade mark) 7725-324 Frosted Crystal Film gives the decorative appearance of sand-blasted glass.

The support tape 26 can be any tape including the layer 34 of repositionable adhesive and the backing 28 which flexes easily and does not stretch when the decorative sheet material 14 is moved away from and then back into contact with the receptor surface 12 so that the decorative sheet material can be returned to its desired position after the first release liner 24 is removed. Suitable support tapes 26 include masking tapes with nonstretchable paper-like backings, particularly including the masking tape commercially available from 3M Company, St. Paul, Minn., under the trade designation 2090 Longmask™ which has low adhesion to glass.

Figure 7:
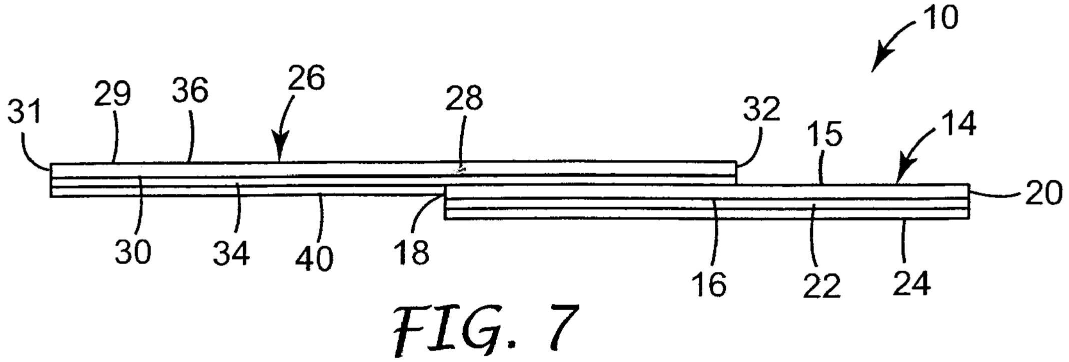
FIG. 7 is an end view similar to FIG. 2 that illustrates a second embodiment of a laminate according to the present invention.

The support tape 26 can be applied to the decorative sheet material 14 at the location at which the decorative sheet material 14 is to be adhered to a substrate either manually or to a roll of the support tape by using a laminating device such as the device described in U.S. Pat. No. 4,990,244, Heil et al., the content whereof is hereby incorporated herein by reference. Alternatively, the support tape 26 could be applied to the decorative sheet material 14 at a location other than that at which the decorative sheet material 14 is to be adhered to a substrate, in which case, as is illustrated in FIG. 7, the laminate 10 could further include a second release liner 40 over a surface of the layer 34 of repositionable pressure sensitive adhesive opposite the backing 28 on the portion 36 of the support tape 26 projecting away from the first edge surface 18 of the decorative sheet material 14. The laminate 10 could then be supplied in long strips which could be rolled.

Figure 2:
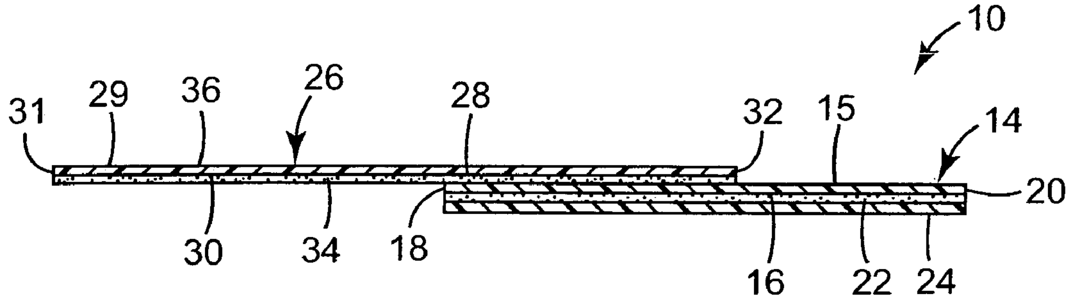
FIG. 2 is an enlarged sectional view taken approximately along line 2-2 of FIG. 1.
Figure 8:
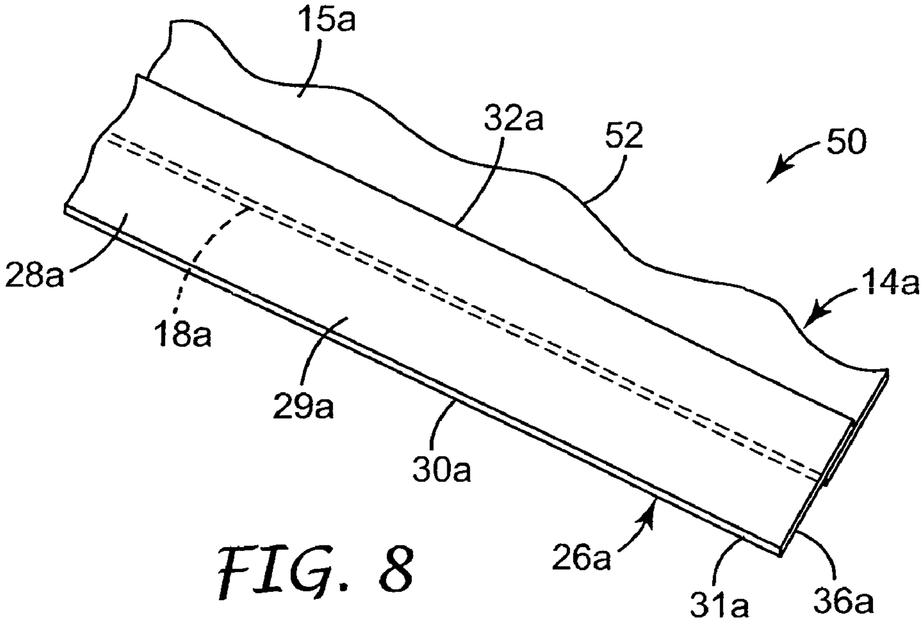
FIG. 8 is a perspective view illustrating a third embodiment of a laminate according to the present invention.

The second edge surface of the decorative sheet material can be straight and parallel to its first edge surface as is the second edge surface 20 of the sheet material 14 illustrated in FIGS. 1, 2, and 3. Alternatively, as shown on a laminate 50 illustrated in FIG. 8 (in which structural features that are essentially the same as those features in the laminate 10 have been identified by the same reference numeral used for the laminate 10 to which have been added the suffix "a") a first edge surface **18*a* of a piece or elongate strip of decorative sheet material 14*a* is generally straight, whereas a second opposite edge surface 52 of that piece of decorative sheet material 14*a*** is irregular.

Figure 9:
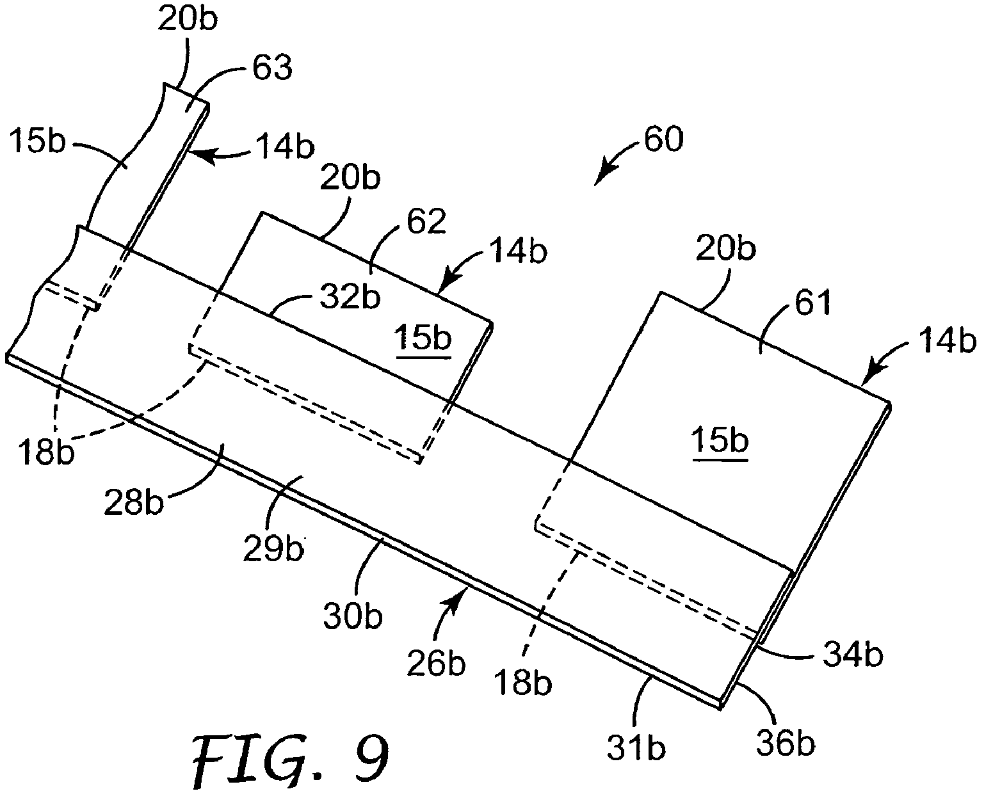
FIG. 9 is a perspective view illustrating a fourth embodiment of a laminate according to the present invention.

Also, as shown on a laminate 60 illustrated in FIG. 9 (in which structural features that are essentially the same as those features in the laminate 10 have been identified by the same reference numeral used for the laminate 10 to which have been added the suffix "b") instead of the decorative sheet material being a continuous strip as are the sheet materials 14 and **14*a* described above, the laminate 60 can include a series of decorative sheet materials 61, 62, and 63 of various configurations (e.g., a series of numbers and/or letters) spaced along the support tape 26*b*, with a portion 36*b* of the support tape projecting away from the first generally straight edges 18*a* of the sheets 61, 62, and 63** of decorative material.

Figure 10:
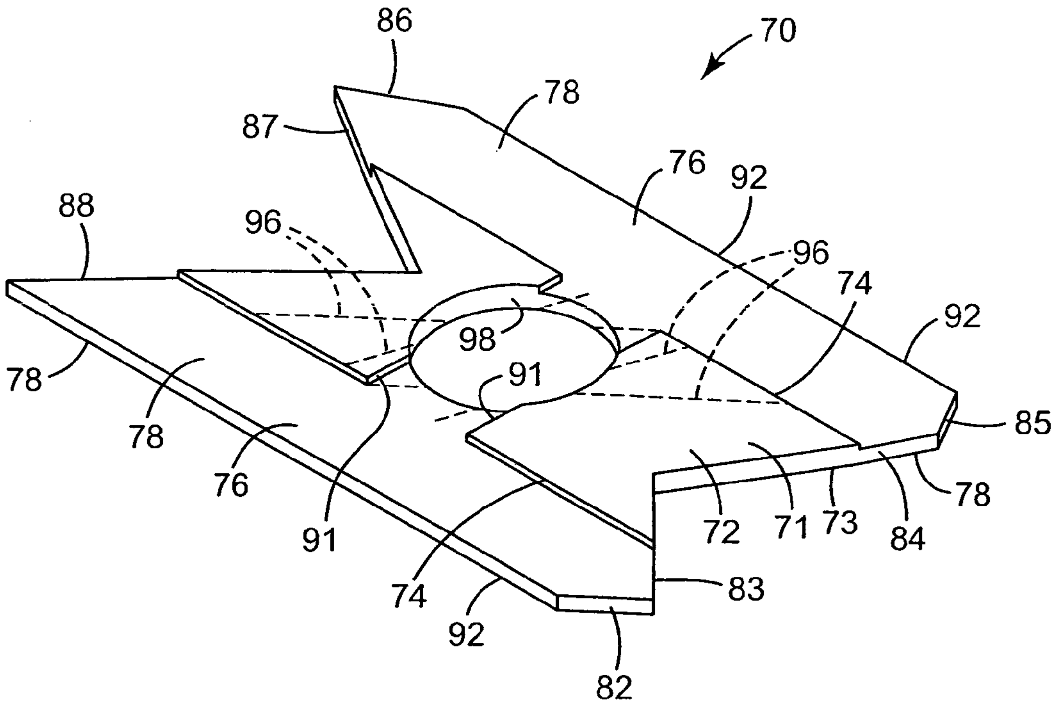
FIG. 10 is a perspective view illustrating a cutting guide that can be used to cut accurately shaped ends on decorative strips applied along a receptor surface.
Figure 11:
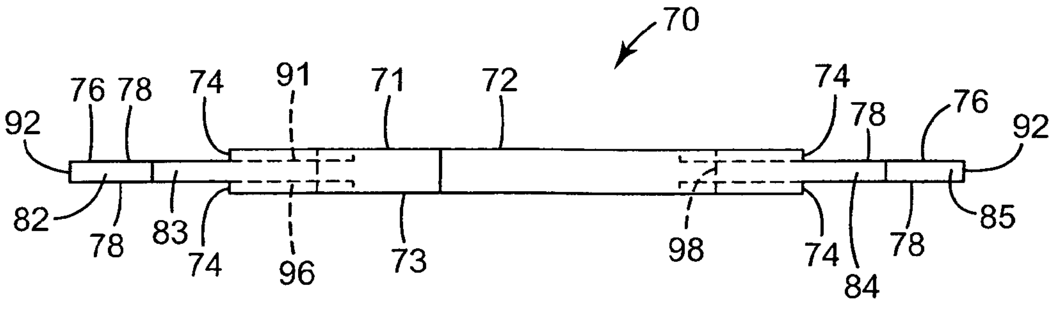
FIG. 11 is an enlarged end view of the cutting guide of FIG. 9.

When applying elongate strips of decorative sheet material such as the pieces or strips of decorative sheet material 14 or **14*a* to a substrate it is often desirable to form new ends on the strips at certain angles with respect to edge surfaces 18, 20; or 18*a* using a sharp cutting implement (e.g., a single edged razor blade or knife). Making cuts at those angles can be facilitated with a cutting guide block 70 of the type illustrated in FIGS. 10 and 11. That guide block 70 includes a central portion 71 having opposite first and second planer surfaces 72 and 73 extending between generally straight edge surfaces 74. The guide block 70 further including two projecting side portions 76 projecting in opposite directions past the edge surfaces 74. Each of the side portions 76 has opposite contact surfaces 78 spaced from and generally parallel to the first and second surfaces 72 and 73 of the central portion 71. Adjacent pairs of edge surfaces 74 of the central portion 71 and contact surfaces 78 of the side portion define channels each adapted to be positioned with the edge surface 74 and contact surface 78 defining that channel engaging the strip of decorative sheet material 14 with its edge surface 74 against the first edge surface 18 of the sheet material 14 and its contact surface 78 against the front surface 15 of the sheet material 14. The guide block 70 has opposite end surfaces including planer parts 82, 83, 84, 85, 86, 87, and 88 at the ends of the projecting side portions 76, which planer parts 82, 83, 84, 85, 86, 87, and 88 are disposed at a different predetermined angles with respect to the edge surfaces 74 defining the channels and are disposed in the shapes of different ends that often are desired to be formed on the strip of decorative sheet material 14. A desired one or ones of the planer parts 82, 83, 84, 85, 86, 87, or 88 can be positioned transverse to the front surface 15 of the strip of decorative sheet material 14 with the edge surface 74 and contact surface 78 defining one of the channels adjacent them engaging the strip of decorative sheet material 14. The desired planer part or parts 82, 83, 84, 85, 86, 87, and 88 can then guide a cutting implement used manually to cut an end surface of the desired shape across the strip of decorative sheet material 14. The planer parts 83, 84, 87, and 88 of the end surfaces that are adjacent the central portion 71 should extend at least along the ends of the projecting side portions 76, and preferably also extend along parts of the ends of the central portion 71 as illustrated, which facilitates engagement of a cutting implement with the strip of sheet material 14 and facilitates manufacture of the guide block 70. As an example and as illustrated, the different predetermined angles of the planer parts 82, 83, 84, 85, 86, 87, and 88 along the projecting side portions 76 with respect to the edge surfaces 74 defining the adjacent channels can be 45, 135, 120, 60, 30, 150, and 45 degrees, respectively. Thus the planer parts 82 and 83 provide a pattern for forming a centered pointed end on or a V-shaped notch in the strip of sheet material 14 with the end surfaces of the strip disposed at 90 degrees with respect to each other; the planer parts 84 and 85 provide a pattern for forming a centered pointed end on or a V-shaped notch in the strip of sheet material 14 with the end surfaces of the strip disposed at 120 degrees with respect to each other; the planer parts 86 and 87 provide a pattern for forming a centered pointed end on or a V-shaped notch in the strip of sheet material 14 with the end surfaces of the strip disposed at 60 degrees with respect to each other; and the planer part 88 provides a pattern for forming a diagonal end on the strip of sheet material 14 disposed at 45 degrees with respect to the edges of the strip. The cutting guide block 70 can also have on one side a transverse channel defined by spaced edges 91 of the central portion 71 disposed at a predetermined angle (i.e., 90 degrees as illustrated) with respect to side surfaces 92 of the projecting side portions 76 so that the guide block 70 can be positioned over the strip of sheet material 14 with the strip of sheet material 14 in the channel and one of the side surfaces 92 can be used to cut an end on the strip of sheet material 14 disposed at 90 degrees with respect to the edges of the strip. A similar transverse channels can be provided on the other side of the guide block 70 that are defined by spaced edges 96 of the central portion 71 disposed at other predetermined angles such as 30 and 60 degrees with respect to the side surfaces 92 so that the guide block 70 can be positioned over the strip of sheet material 14 with the strip of sheet material 14 in one of those channels and the side surfaces 92 can then be used to cut ends on the strip of sheet material 14 disposed at those angles. The guide block 70 can also have a central through circular opening 98 that facilitates handling the guide block 70** and provides visibility for aligning the tape in one of the transverse channels.

The present invention has now been described with reference to several embodiments and modifications thereof. It will be apparent to those skilled in the art that many changes can be made in the embodiments described without departing from the scope of the present invention. For example, the guide block could have more than two sides disposed other than parallel to each other to provide any number of desired cutting guide angles. Thus, the scope of the present invention should not be limited to the structures and methods described in this application, but only by the structures and methods described by the language of the claims and the equivalents thereof.

What is claimed is:

1. A laminate for use in decorating a receptor surface such as the surface of a window, said laminate comprising:

an elongate strip of decorative sheet material having opposite front and rear surfaces extending between a first longitudinally extending generally straight edge surface and an opposite second edge surface of the decorative sheet material;

a layer of aggressive pressure sensitive adhesive on the rear surface of said decorative sheet material, said layer of aggressive pressure sensitive adhesive having a major surface opposite said decorative sheet material;

a first release liner over and in contact with all of said major surface of said layer of aggressive pressure sensitive adhesive opposite said decorative sheet material; and an elongate flexible, temporary support tape comprising a backing having opposite first and second surfaces extending between opposite first and second longitudinally extending edge surfaces of the backing, and a layer of repositionable pressure sensitive adhesive on said second surface, a part of said layer of repositionable pressure sensitive adhesive adjacent the second edge surface of said backing being adhered to a part of the front surface of said decorative strip along said first generally straight edge surface with said opposite second edge surface of the decorative sheet material and a part of the front surface of said decorative strip projecting past the second edge surface of the backing and being visible along the laminate, and with a portion of said support tape projecting away from the first edge surface of said decorative sheet material;

the layer of repositionable adhesive on the projecting portion of the support tape being adherable to and repositionable along a receptor surface with the first release liner on said decorative sheet material laying along that receptor surface to afford precise positioning of the decorative sheet material in a desired location along that receptor surface; and said flexible backing being bendable along a longitudinally extending bend line along the first edge of said decorative sheet material to afford movement of the decorative sheet material away from the receptor surface and thereby removal of the first release liner, and subsequent repositioning of said decorative sheet material with the layer of aggressive pressure sensitive adhesive against the receptor surface to adhere the decorative sheet material against the receptor surface in said desired location, after which the temporary support tape can be peeled away from both the receptor surface and the decorative sheet material.

2. A laminate according to claim 1 further including a second release liner over a surface of said layer of repositionable pressure sensitive adhesive opposite said backing on the portion of said support tape projecting away from the first edge surface of said decorative sheet material.

3. A laminate according to claim 1 wherein said decorative sheet material has grooves or other structure along said front surface so that the decorative sheet material visually simulates a decorative structure.

4. A laminate according to claim 1 wherein said decorative sheet material has light reflecting layers within the decorative sheet material.

5. A method for decorating a receptor surface such as the surface of a window, said method comprising:

providing a laminate comprising an elongate piece of decorative sheet material having opposite front and rear surfaces extending between a first longitudinally extending generally straight edge surface and an opposite second edge surface of the decorative sheet material; a layer of aggressive pressure sensitive adhesive on the rear surface of said decorative sheet material, said layer of aggressive pressure sensitive adhesive having a major surface opposite said decorative sheet material; and a first release liner over and in contact with all of said major surface of said layer of aggressive pressure sensitive adhesive opposite said decorative sheet material;

providing an elongate, flexible, temporary support tape comprising a backing having opposite first and second surfaces extending between opposite first and second longitudinally extending edge surfaces of the backing, and a layer of repositionable pressure sensitive adhesive on said second surface, adhering a part of said layer of repositionable pressure sensitive adhesive adjacent the second edge surface of said backing to a part of the front surface of said decorative sheet material along said first generally straight edge surface with said opposite second edge surface of the decorative sheet material and a part of the front surface of said decorative strip projecting past the second edge surface of the backing so that said part of the front surface of said decorative strip is visible along the laminate, and with a portion of said support tape projecting away from the first edge surface of said decorative sheet material;

adhering the layer of repositionable adhesive on the projecting portion of the support tape along the receptor surface with the first release liner on said decorative sheet material along that receptor surface;

repositioning the layer of repositionable adhesive on the projecting portion of the support tape along the receptor surface as needed to obtain precise positioning of the decorative sheet material in a desired location along that receptor surface;

bending the flexible backing along a longitudinally extending bend line along the first edge of said decorative sheet material to move the decorative sheet material away from the receptor surface;

removing the first release liner;

repositioning the decorative sheet material with the layer of aggressive pressure sensitive adhesive against the receptor surface to adhere the decorative sheet material against the receptor surface in the desired location; and pealing the temporary support tape from both the receptor surface and the decorative sheet material.

6. A method according to claim 5 wherein said step of adhering a part of said layer of repositionable pressure sensitive adhesive adjacent the second edge surface of said backing to a part of the front surface of said decorative sheet material is done at the location of the receptor surface using a portable laminating machine.

7. A method according to claim 5 wherein the laminate further includes a second release liner over a surface of said layer of repositionable pressure sensitive adhesive opposite said backing on the portion of said support tape projecting away from the first edge surface of said decorative sheet material, and said method further includes the step of pealing away the second release liner prior to said step of adhering the layer of repositionable adhesive on the projecting portion of the support tape along the receptor surface.

8. A method according to claim 5 wherein said step of adhering a part of said layer of repositionable pressure sensitive adhesive adjacent the second edge surface of said backing to a part of the front surface of said decorative sheet material is done at the location of the receptor surface.

* * * * *